US012791520B2

(12) United States Patent
Roach et al.

(10) Patent No.: US 12,791,520 B2
(45) Date of Patent: Nov. 10, 2026

(54) METHOD FOR SINGLE CHANNEL FREE-FLOW ELECTROPHORESIS WITH SEQUENTIAL pH ADJUSTMENT

(71) Applicant: ProteinSimple, San Jose, CA (US)

(72) Inventors: David John Roach, Los Gatos, CA (US); Hui Xu, Dublin, CA (US); Tom Weisan Yang, Cupertino, CA (US)

(73) Assignee: ProteinSimple, San Jose, CA (US)

(*) Notice: Subject to any disclaimer, the term of this patent is extended or adjusted under 35 U.S.C. 154(b) by 945 days.

(21) Appl. No.: 17/718,037

(22) Filed: Apr. 11, 2022

(65) Prior Publication Data

US 2022/0236221 A1 Jul. 28, 2022

Related U.S. Application Data

(63) Continuation of application No. PCT/US2020/055071, filed on Oct. 9, 2020.

(Continued)

(51) Int. Cl.
*G01N 27/447* (2006.01)
*B01D 57/02* (2006.01)

(52) U.S. Cl.
CPC ....... *G01N 27/44795* (2013.01); *B01D 57/02* (2013.01); *G01N 27/44769* (2013.01); *G01N 27/44782* (2013.01)

(58) Field of Classification Search
CPC ....... G01N 27/44795; G01N 27/44769; G01N 27/447–44704; G01N 27/4473;

(Continued)

(56) References Cited

U.S. PATENT DOCUMENTS 3,412,008 A * 11/1968 Strickler .......... G01N 27/44769 204/600
3,498,905 A * 3/1970 Strickler .......... G01N 27/44769 204/645

(Continued)

FOREIGN PATENT DOCUMENTS

CN 101184991 A 5/2008
CN 101918825 12/2010

(Continued)

OTHER PUBLICATIONS

International Search Report and Written Opinion, Application No. PCT/US2020/055071, dated Feb. 11, 2021, 16 pages.

(Continued)

*Primary Examiner* — Shizhi Qian
*Assistant Examiner* — Vivian A Tran
(74) *Attorney, Agent, or Firm* — Casimir Jones, S.C.; Brian F. Bradley

(57) ABSTRACT

Embodiments described herein relate to single-channel free-flow electrophoresis devices or apparatuses, and methods for separating and collecting analytes of interest from a sample by sequentially adjusting the pH value of the electrolyte buffers and separating the analyte of interest according to the corresponding isoelectric points of the analyte of interest. The method includes flowing a sample through a single center channel, applying an electric field perpendicular to a flow direction of the sample via an anolyte channel and a catholyte channel that are parallel to the center channel, and then collecting a fraction of the analyte of interest in accordance with their respective isoelectric points.

27 Claims, 12 Drawing Sheets

Related U.S. Application Data

(60) Provisional application No. 62/912,963, filed on Oct. 9, 2019.

(58) Field of Classification Search
CPC ....... G01N 27/44743; G01N 27/44782; G01N 27/44791; G01N 27/453; G01N 2001/4038; B01D 57/02; B01L 2400/0421; C07K 1/24–285; C12Q 2565/125
See application file for complete search history.

(56) References Cited

U.S. PATENT DOCUMENTS

| | | | | |
|---|---|---|---|---|
| 4,588,492 | A | 5/1986 | Bier | |
| 4,834,862 | A * | 5/1989 | Breiner | G01N 27/44747 204/644 |
| 4,994,161 | A * | 2/1991 | Laue | G01N 27/447 204/549 |
| 5,087,338 | A * | 2/1992 | Perry | C07K 1/24 204/544 |
| 6,143,152 | A | 11/2000 | Simpson et al. | |
| 6,328,869 | B1 | 12/2001 | Ogle | |
| 6,919,006 | B2 | 7/2005 | Ogle | |
| 7,390,389 | B2 | 6/2008 | Rossier et al. | |
| 10,067,089 | B2 | 9/2018 | Weber et al. | |
| 2002/0023842 | A1* | 2/2002 | Ogle | B01D 57/02 204/627 |
| 2002/0043465 | A1* | 4/2002 | Vigh | G01N 27/44795 204/627 |
| 2003/0104449 | A1 | 6/2003 | Faupel et al. | |
| 2003/0187380 | A1* | 10/2003 | Botto | A61M 1/3406 204/542 |
| 2003/0226754 | A1 | 12/2003 | Le Febre | |
| 2004/0202994 | A1* | 10/2004 | Timperman | B01D 61/18 435/288.5 |
| 2005/0009994 | A1* | 1/2005 | Solomon | B01D 69/1071 525/330.3 |
| 2005/0072675 | A1* | 4/2005 | Dudziak | C07K 1/26 204/600 |
| 2009/0176315 | A1 | 7/2009 | Han | |
| 2009/0194419 | A1 | 8/2009 | Huang et al. | |
| 2017/0176386 | A1 | 6/2017 | Gentalen | |

FOREIGN PATENT DOCUMENTS

| | | |
|---|---|---|
| CN | 102688692 | 9/2012 |
| GB | 1088308 | 10/1967 |
| WO | 2008/025806 | 3/2008 |
| WO | 2009/062967 | 5/2009 |

OTHER PUBLICATIONS

Supplementary EP Search Report, EP Patent Application No. 20874350.0, dated Oct. 10, 2023, 4 pages.
Fonslow and Bowser: "Free-Flow Electrophoresis on an Anodic Bonded Glass Microchip" Analytical Chemistry, American Chemical Society, vol. 77, No. 17, Sep. 1, 2005, pp. 5706-5710.
Novo Pedro et al. "Current advances and challenges in microfluidic free-flow electrophoresis—A critical review" Analytica Chimica ACTA, vol. 991, Aug. 23, 2017, pp. 9-29.
Anonymous: "Free-flow electrophoresis—Wikipedia", Jan. 21, 2019, XP93087203, Retrieved from the Internet: URL: https://en.wikipedia.org/w/index.php?title=Free-flow_electrophoresis&oldid=879460286 [retrieved on Sep. 29, 2023, 3 pages.
Nissum Mikkel et al. "Free-Flow electrophoresis of the human urinary proteome" Antibody-Drug Conjugates; vol. 263, vol. 484, Jan. 1, 2008, pp. 131-144.
Wingfield P (May 2001). "Protein precipitation using ammonium sulfate". Current Protocols in Protein Science. Appendix 3: A.3F.1-A.3F.8. doi:10.1002/0471140864.psa03fs13. ISBN 978-0471140863. PMC 4817497. PMID 18429073, 1998, 8 pages.
Cuono, C.B. and G.A. Chapo, Gel Electrofocusing in a Natural Ph Gradient of Ph 3-10 Generated by a 47-Component Buffer Mixture. Electrophoresis, 1982. 3(2): p. 65-75.
Ogle, D., et al., Preparative-scale isoelectric trapping separations using a modified Gradiflow unit. J. Chromatogr. A, 2002. 979(1-2): p. 155-161.
Bier, M., et al., New Developments in Isoelectric Focusing, E. Gross and J. Meienhover, Editors. 1979, Pierce Chemical Co.: Rockford, IL. p. 79-89.
Egen, N.B., et al., Electrophoresis '83, H. Hirai, Editor. 1984, Walter de Gruter: Berlin. p. 547-550.
Lucietto, P.L., et al., *Mycobacterium tuberculosis* chaperonin 10 and N-truncated fragments—Their synthesis and purification by the isoelectric focusing technique carried out in solution. J. Pept. Res., 1997. 49(4): p. 308-323.
Petrash, J.M., et al., Resolving Isoforms of Aldose Reductase by Preparative Isoelectric-Focusing in the Rotofor. Electrophoresis, 1991. 12(1): p. 84-90.
Veser, J., Preparative free solution isoelectric focusing of human erythrocyte uroporphyrinogen I synthase in an ampholyte pH gradient. Anal. Biochem., 1989. 182(2): p. 217-221.
Glukhovskiy, P. and G. Vigh, Analytical and preparative-scale isoelectric focusing separation of enantiomers. Anal. Chem., 1999. 71(17): p. 3814-3820.
Weber, G. and P. Bocek, Optimized continuous flow electrophoresis. Electrophoresis, 1996. 17(12): p. 1906-1910.
Weber, G. and P. Bocek, Recent developments in preparative free flow isoelectric focusing. Electrophoresis, 1998. 19(10): p. 1649-1653.
Glukhovskiy, P., T.A. Landers, and G. Vigh, Preparative-scale isoelectric focusing separation of enantiomers using a multicompartment electrolyzer with isoelectric membranes. Electrophoresis, 2000. 21(4): p. 762-766. 15.
Righetti, P.G., E. Wenisch, and M. Faupel, Preparative Protein-Purification in a MultiCompartment Electrolyzer with Immobiline Membranes. J. Chromatogr., 1989. 475: p. 293-309.
Moreda-Pineiro, Antonio, Natalia García-Otero, Pilar Bermejo-Barrera, A review on preparative and semi-preparative offgel electrophoresis for multidimensional protein/peptide assessment, Analytica Chimica Acta vol. 836, Jul. 11, 2014, pp. 1-17.
Patel, P.D. and G. Weber, Electrophoresis in free fluid: a review of the technology and agrifood applications, J. Biol. Phys. Chem. 2003, 3, 60-73.
Hanning, Kurt and Heidrich Hans-G., Free Flow Elektrophoresis, GIT Verlag 1990, ISBN 3-921956-88-9, Book—Table of Contents Only Provided.
Islinger, M; Eckerskorn, C; Völkl, A (2010). "Free-flow electrophoresis in the proteomic era: a technique in flux". Electrophoresis. 31: 1754-63. doi:10.1002/elps.200900771. PMID 20506416.
Scopes RK (1994). Protein Purification—Springer. doi:10.1007/978-1-4757-2333-5. ISBN 978-1-4419-2833-7, 397 pages.
Wang S., et al., eds., Protein Chemistry, Tongji University Press, Aug. 31, 2012, 4 pgs.

* cited by examiner

METHOD FOR SINGLE CHANNEL FREE-FLOW ELECTROPHORESIS WITH SEQUENTIAL pH ADJUSTMENT

CROSS REFERENCE TO RELATED APPLICATION

This application is a continuation of International Application No. PCT/US20/55071, filed Oct. 9, 2020, titled "Method for Single Channel Free-Flow Electrophoresis with Sequential pH Adjustment," which claims priority to U.S. Provisional Patent Application Ser. No. 62/912,963, filed Oct. 9, 2019, entitled "Method for Single Channel Free-Flow Electrophoresis with Sequential pH Adjustment", the entire disclosure of each of which is hereby incorporated by reference.

FIELD

Some embodiments described herein relate to apparatuses and methods for the separation and collection of protein samples.

BACKGROUND

Electrophoresis, including isoelectric focusing (IEF), is a common technique for protein separation. IEF is an electrophoretic technique that separates proteins and other amphoteric solutes in a pH gradient according to their isoelectric points (pI). Synthetic carrier ampholytes are small amphoteric molecules that rapidly establish a pH gradient after applying an electric field. Once the pH gradient is established, slower-moving proteins and other amphoteric molecules will focus and concentrate at their pI. IEF can be performed at both the preparative and the analytical scale. Preparative scale IEF devices have typically lagged their analytical counterparts due to the inability of preparative scale devices to effectively dissipate Joule heat and keep convective mixing to a minimum. In addition, subsequent purification steps may be required due to the incompatibility of ampholytes with common downstream analyses such as mass spectrometry. As a consequence, commercially available preparative scale IEF devices suffer the issues of low throughput and poor.

Free-flow electrophoresis (FFE) is an analogous technique to capillary electrophoresis, with a comparable resolution, where semi-preparative and preparative amounts of samples can be generated. The two typical modes of separation for FFE are zone electrophoresis (ZE) and IEF. In FFE systems, sample separation and collection are continuous processes. Although FFE systems have some advantages of throughput and resolution over preparative scale capillary IEF devices, such FFE systems are expensive to operate as they consumes tremendous amounts of reagents such as ampholytes while running. Further, known FFE instruments are cumbersome to set up and maintain, and bubbles are a source of irreproducibility.

In view of the serious drawbacks of the current commercial products, the present disclosure describes devices and methods for single-channel free-flow electrophoresis that maintains the feature of continuous flow for sample separation and collection. The apparatuses described herein are operable to isolate analytes having a particular pI and have medium to high throughput for sample preparation. The single-channel devices described herein generally allow much lower reagent consumption and have much simpler setup and operation as compared to known FFE devices.

Additionally, unlike known FFE devices, some embodiments described herein do not require ampholytes.

SUMMARY

Some embodiments described herein relate to apparatuses and methods for collection and separation of samples containing biological materials or analytes, such as proteins.

Some embodiments described herein relate to an apparatus configured to electrophoretically fractionate a sample containing a mixture of analytes as the sample flows hydrodynamically through a center channel. The apparatus can be configured to receive the sample via an inlet and expel at least a portion of the sample (e.g., a fractionated analyte of interest) via an outlet. The apparatus can be configured to be operated with a continuous flow of the sample, such that the sample is fractionated electrophoretically while the sample moves hydrodynamically through the center channel. Anolyte and catholyte channels can be disposed in parallel to and on opposite sides of the center channel. The anolyte and catholyte channels can be configured to be filled with electrolyte and coupled to an anode and a cathode, respectively. A hydrodynamic barrier, such as a porous membrane, can be disposed between the center channel and at least one of the anolyte channel and the catholyte channel. When energized (i.e., when an electric potential is applied to the anode and cathode) the anolyte and catholyte channels can collectively induce an electric field that is oriented perpendicular to the center channel. As discussed in further detail below, analytes having a pI different from the pH of the sample buffer and/or electrolyte buffer can migrate in the direction of the electric field (perpendicular to the direction of hydrodynamic flow), into or through the hydrodynamic barrier, and out of the center channel. Thus, fractions of the sample not having a pI matching the pH of the sample buffer and/or electrolyte buffer can be removed from the bulk flow of the sample and a fraction containing an enriched fraction (in some instances, a substantially pure fraction) of an analyte(s) having a pI matching the pH of the sample buffer and/or electrolyte buffer can exit the center channel via the outlet. As discussed in further detail herein particular analytes of interest can be purified by controlling the pH of the sample and/or electrolyte buffer.

In some embodiments, a body of an apparatus can define an inlet configured to receive a sample containing a mixture of analytes. In some embodiments, the mixture of analytes can comprise proteins. The body of the apparatus can define an outlet configured to expel a fractionated portion of the sample (e.g., containing an enriched or substantially pure an analyte of interest). The body of the apparatus can define a catholyte channel configured to be coupled to a cathode and an anolyte channel configured to be coupled to an anode. The apparatus can include a cover and a hydrodynamic barrier (e.g. constructed of cellulose, polyvinylidene fluoride, polyvinylidene difluoride, polytetrafluoroethylene, or any other suitable material) disposed between the cover and the body. The hydrodynamic barrier, the body, and the cover can collectively form a center channel between the inlet and the outlet that is parallel to the catholyte channel and the anolyte channel. In some embodiments, the center channel can be defined, in part, by a hollow space or cut-out of the hydrodynamic barrier.

In some embodiments, at least one of the catholyte channel or the anolyte channel can be fluidically connected to a reservoir configured to contain an electrolyte buffer. For example, the reservoir can contain a MES-BisTris buffer. In some instances, the electrolyte buffer can contain one or more polymers such as methyl cellulose (e.g., at between 0.1% and 0.5% by weight). Such a reservoir can have a volume between 100 mL and 500 mL. A pump can be configured to recirculate electrolyte from the reservoir through the catholyte channel and/or the anolyte channel via separate loops. In other embodiments, the pump can be configured to recirculate the electrolyte buffer from the reservoir first through the anolyte channel and then the catholyte channel (or vice versa) before returning to the reservoir.

In some embodiments, the apparatus can comprise the anode and the cathode. The anode and cathode can be electrically coupled to the anolyte channel and the catholyte channel, respectively, such that when energized, the anolyte channel and the catholyte channel collectively apply an electric field across and perpendicular to the center channel.

In some embodiments, the body of the apparatus as described herein can define an inlet of the catholyte channel and an outlet of the catholyte channel. In one embodiment, the body can be plastic and/or substantially waterproof.

In some embodiments, the mixture of analytes can include peptides having isoelectric points (pI) between 1 and 11. As discussed in further detail herein, the electrolyte buffer and/or a sample buffer can be configured to fractionate the analytes of the sample such that an analyte(s) of interest is selectively enriched or purified based on its pI point. Thus, in some embodiments, the electrolyte buffer can have a pH value between 0.1 and 14 such that analytes having a corresponding pI value within that range can be selectively enriched or purified.

In some embodiments, pores of the hydrodynamic barrier can have a median characteristic length (e.g., diameter) between 25 nm and 800 nm. In some embodiments, the hydrodynamic barrier can have a thickness between 100 μm and 200 μm. In some embodiments, the center channel can have a width between 1 mm and 10 mm. In some embodiments, the center channel can have a length between 10 cm and 20 cm.

Some embodiments described herein relate to methods of fractionating a mixture of analytes. The sample can be flowed through a center channel of a single-channel free-flow electrophoresis device. An electric field can be applied perpendicular to a flow direction of the sample via an anolyte channel and a catholyte channel containing an electrolyte buffer that are parallel to the center channel. The center channel can be electrically and/or ionically coupled but fluidically isolated from at least one of the anolyte channel and the catholyte channel via a hydrodynamic barrier. An analyte of interest can be separated from the sample according to the analyte of interest's isoelectric point and a pH value of the electrolyte buffer and/or the sample buffer. A fraction of the sample containing the analyte of interest can be separated from the mixture of analytes and collected. The fraction can contain an enriched or substantially pure analyte of interest.

In some embodiments, the methods can include circulating an electrolyte buffer from a reservoir and through the anolyte channel and/or the catholyte channel. In some embodiments, the methods can comprise applying a voltage across the anolyte channel and the catholyte channel to create the electric field. In some embodiments, the methods can comprise circulating an electrolyte buffer from a reservoir such that the electrolyte buffer can flow through the anolyte channel and the catholyte channel before returning to the reservoir. In some embodiments, the methods as described herein can comprise circulating an electrolyte buffer from a reservoir such that the electrolyte buffer can flow through the anolyte channel and the catholyte channel in two separate loops.

In some embodiments, the fraction of the sample used in the methods as described herein can contain the analyte of interest collected at the rate between 5 μL per minute and 15 μL per minute. In some embodiments, the pH value of the electrolyte buffer can be sequentially adjusted. In some embodiments, the pH value of the electrolyte buffer can be sequentially adjusted by modifying the ratio of MES and BisTris. In some embodiments, the pH value of the electrolyte buffer can be identical to a sample buffer contained in the sample.

In some embodiments, the pH value of the electrolyte buffer and/or the sample can be sequentially adjusted, for example, via a metered pump or valve. Thus, multiple analytes having different isoelectric points can be sequentially separated based on the pH of the electrolyte buffer and/or the sample buffer during the time at which that fraction is flowing through the center channel and/or collected. In some embodiments, the analyte of interest can be collected at a constant rate.

BRIEF DESCRIPTION OF THE DRAWINGS

FIG. 1A shows an assembled device. FIG. 1B shows the exploded view of the device that shows three pieces: the body, typically made of plastic, the middle piece made of porous membrane materials, and the cover positioned at the bottom of the device typically made of glass or metals.

FIG. 2A shows an embodiment with the re-circulation with a single loop. FIG. 2B shows an embodiment with the re-circulation with two separate loops.

FIG. 3A shows the fractionation of the mixture of peptides with the buffer pH at 5.8. FIG. 3B shows the fractionation of the mixture of peptides with the buffer pH at 6.3. FIG. 3C shows the fractionation of the mixture of peptides with the buffer pH at 6.7.

FIG. 4A shows the fractionation of the mixture of peptides with the buffer pH at 6.3. FIG. 4B shows the fractionation of the mixture of peptides with the buffer pH at 6.5.

DETAILED DESCRIPTION

Figure 1A:
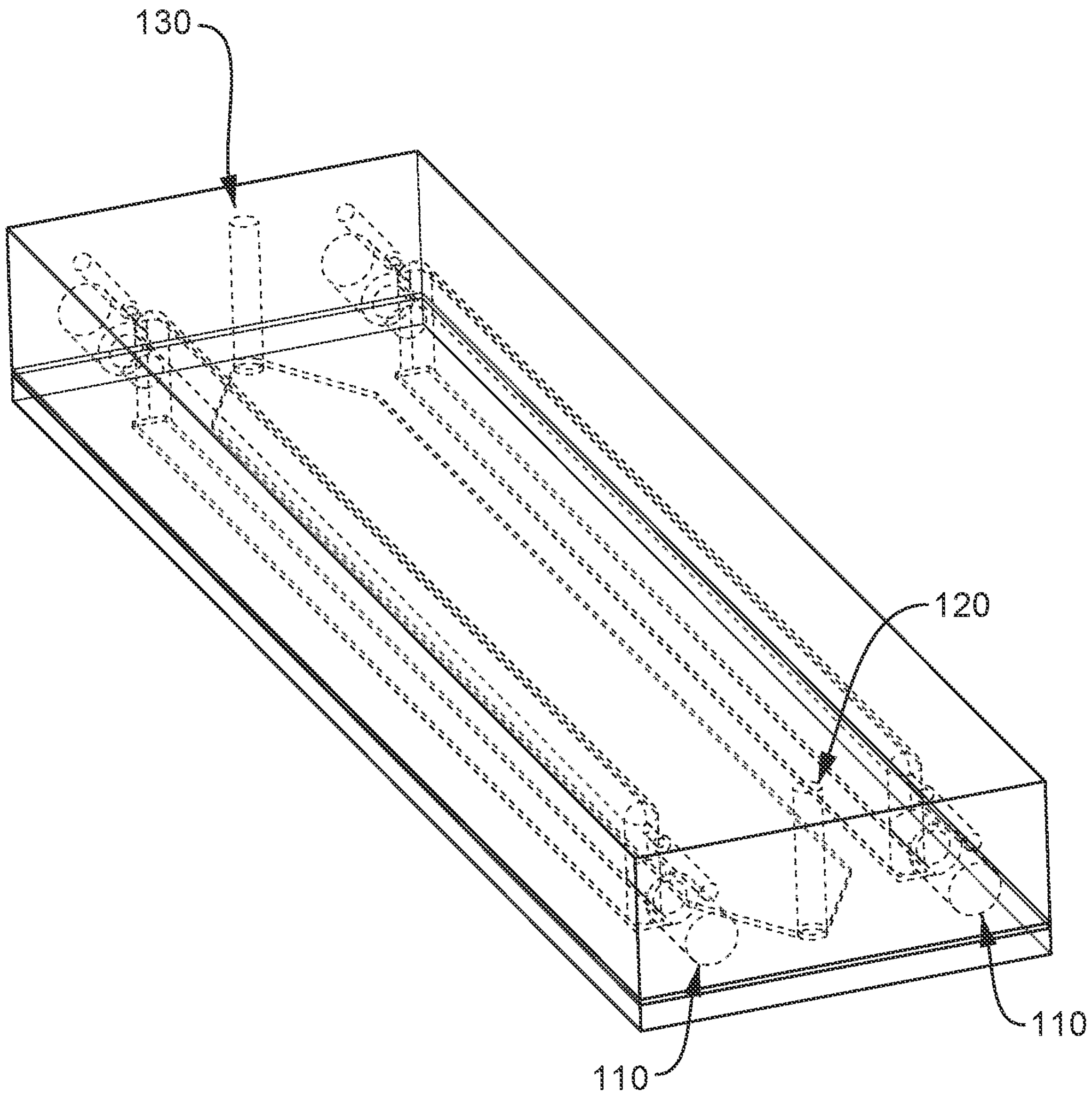
FIGS. 1A and 1B illustrate the assembly of a single-channel free-flow electrophoresis device, according to an embodiment.

While various embodiments of the present disclosure have been shown and described herein, it will be obvious to those skilled in the art that such embodiments are provided by way of example only. Numerous variations, changes, and substitutions may occur to those skilled in the art without departing from the present disclosure. It should be understood that various alternatives to the embodiments of the present disclosure described herein may be employed.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the term "protein" refers to proteins, oligopeptides, peptides, and analogs, including proteins containing non-naturally occurring amino acids and amino acid analogs, and peptidomimetic structures. The term "protein" also refers to proteins, oligopeptides, peptides, and analogs that have various isoelectric points.

As used herein, the term "analyte" refers to any molecule or compound to be detected or separated, as described herein. Suitable analytes can include but are not limited to, small chemical molecules such as, for example, environmental molecules, clinical molecules, chemicals, pollutants, and/or biomolecules. More specifically, such chemical molecules can include but are not limited to pesticides, insecticides, toxins, therapeutic and/or abused drugs, hormones, antibiotics, antibodies, organic materials, proteins (e.g., enzymes, immunoglobulins, and/or glycoproteins), nucleic acids (e.g., DNA and/or RNA), lipids, lectins, carbohydrates, whole cells (e.g., prokaryotic cells such as pathogenic bacteria and/or eukaryotic cells such as mammalian tumor cells), viruses, spores, polysaccharides, glycoproteins, metabolites, cofactors, nucleotides, polynucleotides, transition state analogs, inhibitors, nutrients, electrolytes, growth factors and other biomolecules and/or non-biomolecules, as well as fragments and combinations thereof. Some analytes described herein can be proteins such as enzymes, drugs, cells, antibodies, antigens, cellular membrane antigens, and/or receptors or their ligands (e.g., neural receptors or their ligands, hormonal receptors or their ligands, nutrient receptors or their ligands, and/or cell surface receptors or their ligands).

As used herein, the term "catholyte" can refer an electrolyte which is on the cathode side of an electrophoresis device. As used herein, the term "anolyte" can refer to an electrolyte on the anode side of an electrophoresis device. In some embodiments, a common electrolyte is used on both sides of the electrophoresis device.

As used herein, the term "sample" refers to a composition that contains an analyte or analytes to be detected or separated. A sample can be heterogeneous, containing a variety of components (e.g., different proteins) or homogenous, containing one component. In some instances, a sample can be naturally occurring, a biological material, and/or a man-made material. Furthermore, a sample can be in a native or denatured form. In some instances, a sample can be a single cell (or contents of a single cell) or multiple cells (or contents of multiple cells), a blood sample, a tissue sample, a skin sample, a urine sample, a water sample, and/or a soil sample. In some instances, a sample can be from a living organism, such as a eukaryote, prokaryote, mammal, human, yeast, and/or bacterium or the sample can be from a virus. In some instances, a sample can be one or more stem cells (e.g., any cell that can divide for indefinite periods of time and to give rise to specialized cells). Suitable examples of stem cells can include but are not limited to embryonic stem cells (e.g., human embryonic stem cells (hES)), and non-embryonic stems cells (e.g., mesenchymal, hematopoietic, induced pluripotent stem cells (iPS cells), or adult stem cells (MSC)).

Apparatuses and methods of the present disclosure generally relate to the separation and collection of analytes of interest contained in a sample according to their isoelectric points (pI). In some embodiments, various analytes of interest can be separated and collected sequentially. As described herein, the single-channel free-flow electrophoresis system allows protein samples to be mixed with a pH-controlled buffer and continuously flowed into a channel while an electric field is applied that is non-parallel to the flow direction. The electric field causes charged analytes to migrate in the direction of the electric field or in the direction opposite the direction of the electric field, such that the charged analytes move away from the direction of the hydrodynamic flow and, in some instances, out of the center channel, separating them from non-charged and/or lesser-charged analytes. In some embodiments, the electric field is oriented perpendicular to the direction of hydrodynamic flow causing non-target analytes to migrate perpendicularly from the channel. In other embodiments, the electric field can have any suitable orientation that is non-parallel to the direction of hydrodynamic flow such that at least a component (e.g., a vector component) of the electric field causes charged analytes to move in a direction that is perpendicular to the direction of hydrodynamic flow. As described herein, features (e.g., an electric field and center channel) are "perpendicular" when they are substantially perpendicular. Substantially perpendicular, as used herein refers to features oriented at 90 degrees to each other, plus or minus less than 5 degrees.

In some embodiments, a porous membrane is configured to form at least a portion of the channel. Thus, non-target analytes having a velocity vector that is non-parallel to the direction of the channel (e.g., as induced by a non-parallel electric field) can exit the channel and bulk hydrodynamic flow of the sample and enter the porous membrane. In some such embodiments, the channel is defined, in part, by a hollow space in the center of the porous membrane. In some embodiments, sidewalls of the channel can be defined by porous membrane materials through which the buffer ions and proteins can migrate.

The present disclosure provides that the proteins with pI having either positive or negative charge depending on the background buffer pH would be driven out of the channel by the electric field applied to the device or apparatus as described herein. This device or apparatus can isolate neutral molecules (e.g., analytes having a pI matching the pH of the background buffer) from their charged counterparts. Such neutral molecules can remain in the channel and flow into the collection container located at the end of the channel. The present disclosure provides that by changing the pH of the background buffer (e.g., sample buffer and/or electrolyte buffer) sequentially, proteins of different pI values can be collected, one at a time, resulting in fractionation of the proteins in accordance with their charge.

Figure 1B:
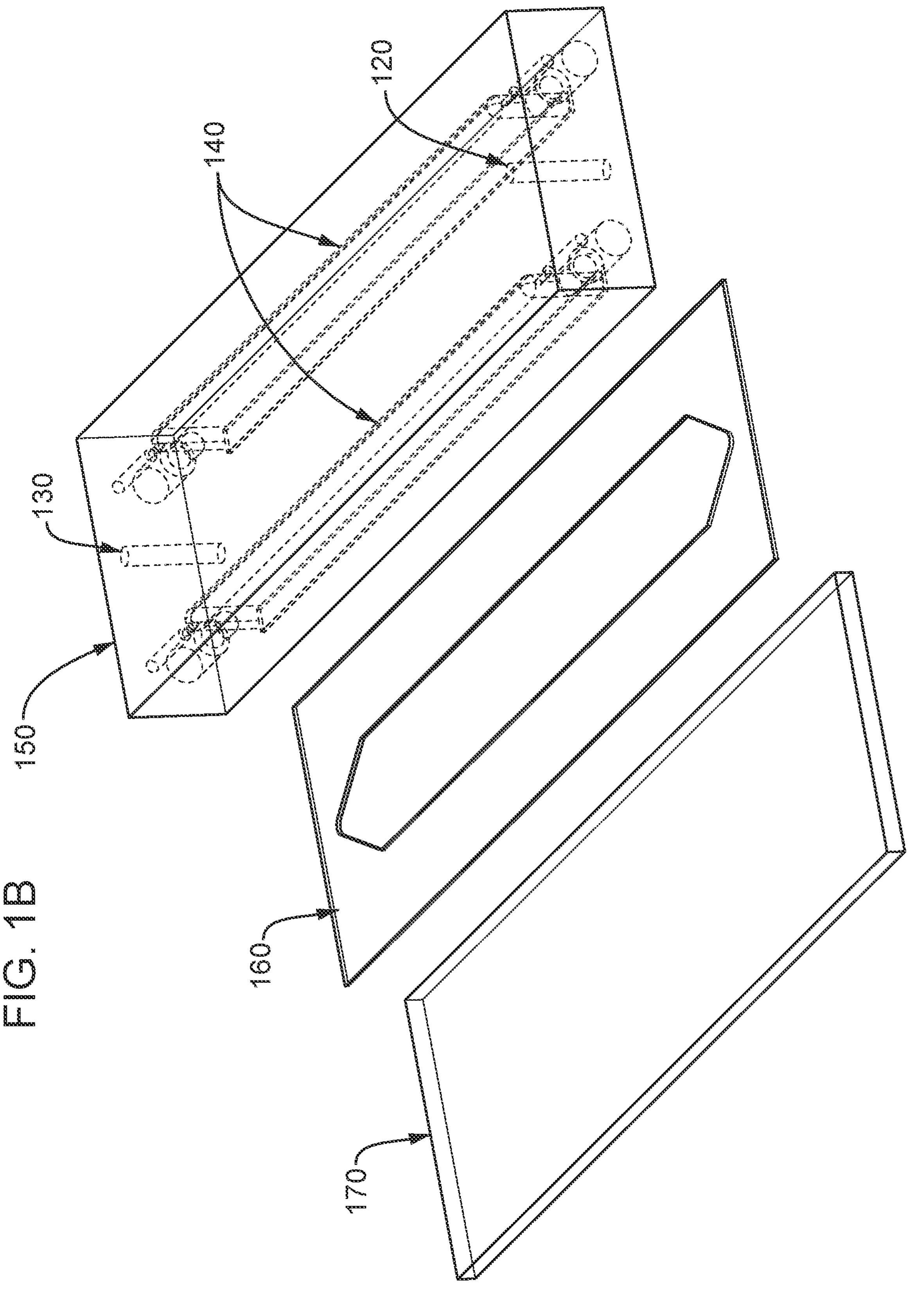

FIGS. 1A and 1B depict a single-channel free-flow electrophoresis device or apparatus, according to an embodiment. The device includes: (1) a body 150 (i.e., a top cover), (2) a porous membrane 160 (also referred to as a spacer), and (3) a bottom cover 170. The body defines two buffer channels 140 parallel to each other that are configured to be filled with an electrolyte buffer. Typically, one channel is configured to contain an anoylyte and the other channel is configured to contain a catholyte. The body 150, the porous membrane 160, and the bottom cover 170, collectively, define a center channel that is parallel to and between the two buffer channels 140. An inlet 120 allows a sample (typically containing a mixture of analytes) to enter the center channel, and an outlet 130 allows fractions of a sample to be collected at the opposite side of the device. As described herein a channel (or other feature) is "parallel" to another channel (or other feature) when they are substantially parallel. Substantially parallel, as used herein refers to features offset by less than 30 degrees, less than 10 degrees, or by 0 degrees, inclusive of all ranges and subranges therebetween.

The body 150 is typically constructed of a waterproof and non-conductive material, such as plastic (e.g., acrylic, polycarbonate, cyclic olefin copolymer (COC), cyclo olefin polymer (COP), polyethylene, or polystyrene), but could be constructed of any suitable material.

The porous membrane 160 is disposed between the body 150 and the bottom cover 170 and, with the body 150 and the bottom cover 170 defines the center channel. The body 150 defines the top of the center channel, while the bottom cover 170 defines the bottom of the center channel. The porous membrane 160 acts as a spacer between the body 150 and bottom cover 170 such that the thickness of the porous membrane defines the height of the center channel. As shown in FIGS. 1A and 1B, a hollow space or cutout from the porous membrane 160 defines the length and width of the center channel.

The porous membrane 160 is configured to be wetted on opposite sides by the sample (as it flows through the center channel) and the electrolyte buffer (as it flows through the buffer channels 140). The porous membrane 160 is configured to electrically and/or ionically couple the sample to the electrolyte buffer while preventing or impeding hydrodynamic flow from entering the buffer channels 140 from the center channel.

The porous membrane 160 can be made of cellulose, polyvinylidene fluoride or polyvinylidene difluoride (PVDF), polytetrafluoroethylene (PTFE), or any other suitable materials. The porous membrane 160 is generally configured to allow ions and/or analytes to migrate into/across the porous membrane 160 while preventing hydrodynamic fluidic flow. "Preventing or impeding hydrodynamic flow" or "fluidically isolated/ing" as disclosed herein refers to decreasing the volumetric flow rate relative to the center channel by at least 95%, at least 99%, at least 99.9% or at least 100%, inclusive of all ranges and subranges therebetween on a volumetric basis relative to flow through the center channel.

Although embodiments are generally described as containing a porous membrane 160, it should be understood that any suitable object or structure can be disposed between the center channel and at least one of the anolyte buffer channel and/or the catholyte buffer channel. For example, a hydrodynamic impediment can be configured to electrically and/or ionically couple the sample to the electrolyte buffer while preventing or impeding hydrodynamic flow from entering the buffer channels 140 from the center channel. For example, a gel or other material suitable for electrophoresis, a network of microchannels, a network of nanochannels, a porous membrane 160, and/or any other suitable structure or material can serve as a hydrodynamic impediment and be disposed between the center channel and at least one of the anolyte buffer channel and the catholyte buffer channel.

The bottom cover 170 can be made of a non-porous material. In some embodiments, the non-porous material can be glass. In some embodiments, the non-porous material can be aluminum. In some embodiments, the non-porous material is electrically insulated. In some embodiments, the non-porous material is nonconductive. In some embodiments, a thin film made of PTFE, Teflon®, PVDF, or any other suitable insulative and/or hydrophobic material that can be applied to the bottom cover 170 to prevent protein adsorption into the bottom cover 170 and provide electrical isolation (if required). In some embodiments, the thin film of insulative material can reduce electroosmotic flow. In some embodiments, the thin film of insulative material can reduce the magnitude of the zeta potential of the bottom cover 170. In some embodiments, the thin film of insulative and/or hydrophobic material can reduce or prevent proteins or other analytes from adhering to the bottom cover 170. In some embodiments, the thin film of insulative material can be positioned between the bottom cover 170 and the porous membrane 160. In some embodiments, the thin film made of insulative material can be positioned between the bottom of the s body 150 and the porous membrane 160. In some embodiments, the thin film made of insulative material has a thickness of about 50 μm, about 55 μm, about 60 μm, about 65 μm, about 70 μm, about 75 μm, about 80 μm, about 85 μm, inclusive of all ranges and subranges therebetween. In some embodiments, the bottom cover 170 of the assembled device can be placed on top of a thermo-electric cooler or cold block that is temperature regulated by the re-circulation of refrigerated coolant.

The catholyte buffer channel is configured to be coupled to a cathode, and the anolyte buffer channel is configured to be coupled to an anode. In some embodiments, the device or apparatus can include the anode and the cathode. In some embodiments, the electrodes (i.e., the cathode and/or the anode) can be made of platinum. In some embodiments, the electrodes can be made of copper. In some embodiments, the electrodes can be made of graphite. In some embodiments, the electrodes can be made of titanium. In some embodiments, the electrodes can be made of brass. In some embodiments, the electrodes can be made of silver. In some embodiments, the electrodes can be made of carbon fiber materials. In some embodiments, the electrodes can be made of gold. In some embodiments, the electrodes can be made of stainless steel or any material that is suitable for electrophoresis processes.

As shown in FIGS. 1A and 1B, the electrolyte buffer can be stored within electrolyte buffer tanks that are fluidically coupled to the anolyte buffer channel and/or the catholyte buffer channel via ports 110. In other embodiments, the buffer channels 140 themselves can be buffer reservoirs. Buffer reservoirs can have a volume between 10 mL to 1000 mL, 20 mL to 900 mL, 30 mL to 800 mL, 40 mL to 700 mL, 50 mL to 600 mL, 60 mL to 500 mL, 70 mL to 400 mL, 80 mL to 300 mL, 90 mL to 200 mL, 100 mL to 150 mL, 100 mL and 500 mL, 100 mL and 400 mL, 100 mL and 300 mL, 100 mL and 200 mL, inclusive of all ranges and subranges therebetween. In some embodiments, the buffer reservoir can have a volume between 100 mL and 500 mL, 100 mL and 400 mL, 100 mL and 300 mL, 100 mL and 200 mL, inclusive of all ranges and subranges therebetween. In yet other embodiments, the buffer reservoir can have a volume between 100 mL and 500 mL.

In some embodiments, buffer (i.e., anolyte and catholyte) channels 140 can be located at either side of the body, in parallel with the center channel. Embodiments having a single-channel for sample separation (e.g., a single "center" channel) can be advantageous in that reagent or buffer consumption with such a design tends to be lower than designs having multiple channels for sample separation, which can decrease the overall cost for separating and collecting the desired analytes of interest compared with known devices. It should be understood, however, that other designs having multiple channels for sample separation may be possible.

In some embodiments, the device or apparatus as described herein can comprise only one inlet 120 and only one outlet 130. A single inlet 120 and a single outlet 130 can, in some embodiments, be preferred because it avoids potential difficulties with unbalanced flow, which can occur when multiple inlets and/or outlets are used. It should be understood, however, that in other embodiments, multiple inlets and/or outlets may be used to, for example, increase throughput. Another advantage of the device or apparatus as described herein would be the reduction of the formation of bubbles that can be trapped inside the channels. The size of the inlet 120, outlet 130, and/or channels included in the present device or apparatus can be narrow, which facilitates steady liquid filling and avoids turbulent flow, analogous to microfluidic devices. In some embodiments, the inlet 120 and the outlet 130 can be oriented perpendicularly to the buffer channels 140, and the center channel.

The porous membrane 160 can prevent or substantially impede the hydrodynamic flow while allowing electrokinetic (and/or electrophoretic) transport of ions and analytes. By preventing or substantially impeding the hydrodynamic flow while allowing electrokinetic transport of analytes to go through the porous membrane 160, the present device or apparatus is configured to substantially allow only the target analyte (i.e. analytes of interest) transported hydrodynamically down the center channel to the outlet 130.

For example, when the background pH value (e.g., the pH of the center channel and/or buffer channels 140) is set at 6.0, analytes that have a pI value of 6.0 are freely transported hydrodynamically down the center channel to the outlet 130, whereas the analytes that have pI values other than 6.0 move in a direction that is non-parallel to the hydrodynamic flow, towards and/or into the porous membrane 160. Analytes that migrate into the porous membrane 160 exit the hydrodynamic flow and do not move towards the outlet 130 with the hydrodynamic flow. Thus, the porous membrane 160 is operable to filter out non-target analytes.

In some embodiments, the center channel can have width, of from about 1 mm to about 10 mm, about 1 mm to about 9 mm, about 1 mm to about 8 mm, about 1 mm to about 7 mm, about 1 mm to about 6 mm, about 1 mm to about 5 mm, about 1 mm to about 4 mm, about 1 mm to about 3 mm, inclusive of all ranges and subranges therebetween. In some embodiments, the center channel can have a length of from about 1 cm to 30 cm, 5 cm to 25 cm, 10 cm to 30 cm, 10 cm to about 20 cm, about 10 cm to about 19 cm, about 10 cm to about 18 cm, about 10 cm to about 17 cm, about 10 cm to about 16 cm, about 10 cm to about 15 cm, inclusive of all ranges and subranges therebetween. In some embodiments, the center channel has a length of from about 10 cm to about 20 cm.

In some embodiments, the pore size of the porous membrane 160 can range from about 25 nm to about 800 nm, about 30 nm to about 700 nm, about 40 nm to about 600 nm, about 50 nm to about 500 nm, about 60 nm to about 400 nm, about 70 nm to about 300 nm, about 80 nm to about 200 nm, about 90 nm to about 100 nm, about 35 nm to about 750 nm, about 45 nm to about 650 nm, about 55 nm to about 550 nm, about 65 nm to about 450 nm, inclusive of all ranges and subranges therebetween. In some embodiments, the pore size of the porous membrane 160 can be any suitable size so long as it is compatible with the device or apparatus as disclosed herein, or it at least permits the permeation of the target analytes. In some embodiments, the thickness of the porous membrane 160 can range from about 100 μm to about 200 μm, about 110 μm to about 190 μm, about 120 μm to about 180 μm, about 130 μm to about 170 μm, about 140 μm to about 150 μm, inclusive of all ranges and subranges therebetween. In some embodiments, the thickness of the porous membrane 160 ranges from about 100 μm to about 200 μm, from about 90 nm to about 600 μm, 100 nm to 500 μm, 200 nm to 400 μm, 300 nm to 300 μm, 400 nm to 200 μm, 500 nm to 100 μm, 600 nm to 90 μm, 700 nm to 80 μm, 800 nm to 70 μm, 900 nm to 60 μm, 1 μm to 50 μm, 10 μm to 40 μm, 20 μm to 30 μm, inclusive of all ranges and subranges therebetween.

Figure 7:
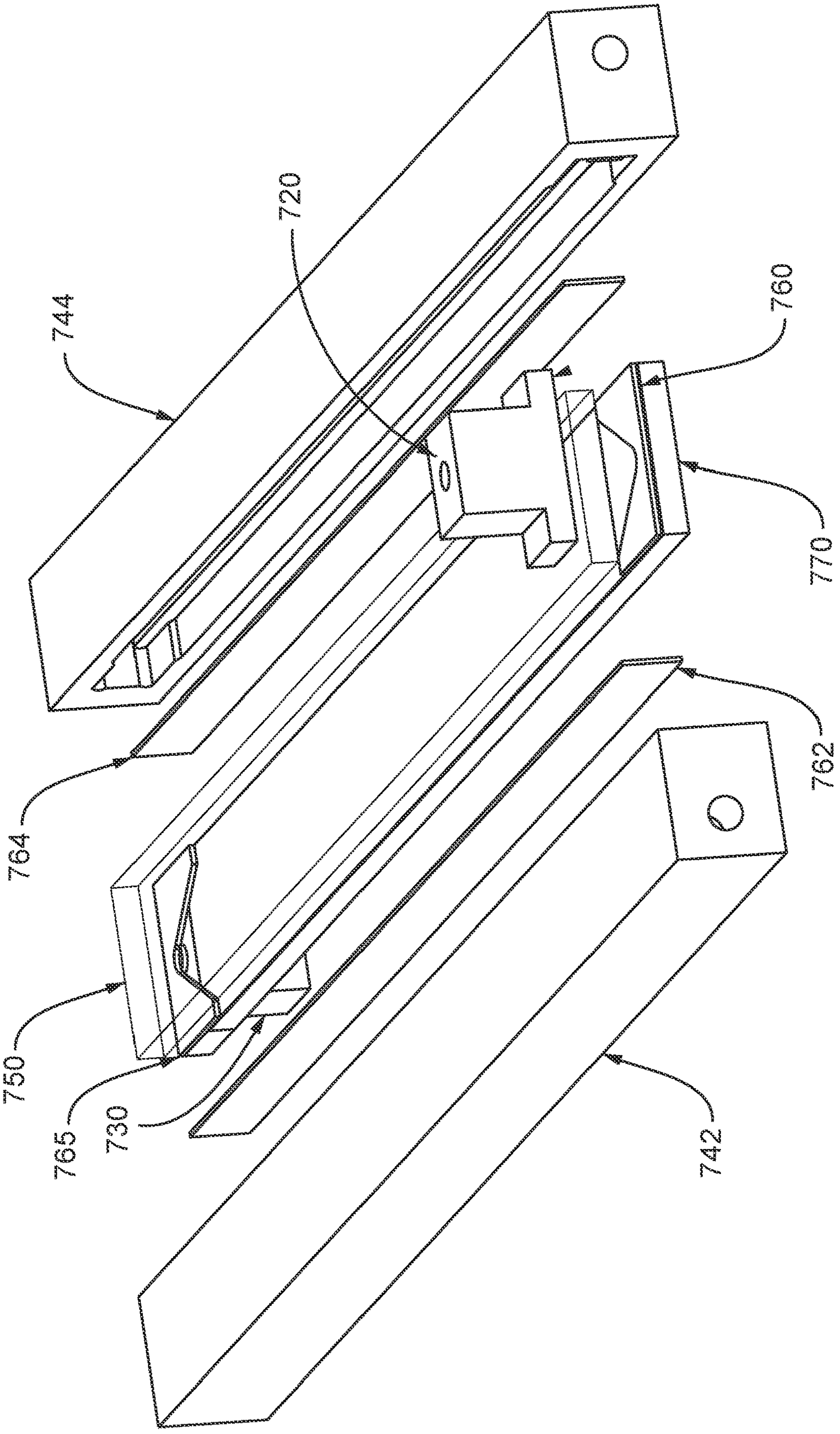
FIG. 7 shows the exploded view of a device that, according to an embodiment, has at least six pieces: the top cover, the spacer, the bottom cover, two buffer tanks and electrodes, and two pieces of membrane.

FIG. 7 depicts a single-channel free-flow electrophoresis device or an apparatus, according to an embodiment, that includes: (1) a top cover 750 that can be made of glass, or any other suitable material materials, (2) a bottom cover 770 that can be made of plastic or any other suitable materials, (3) a spacer 764 that is positioned between the top cover and the bottom cover, (4) two parallel membranes 762, 764, (5) an inlet 720 that is positioned on the top of the top cover 750, (6) an outlet 730 that is positioned at the bottom of the bottom cover 770, (7) an anolyte buffer tank 742, and (8) a catholyte buffer tank 744. The anolyte buffer tank 742 and the catholyte buffer tank 744 can function as parallel electrodes such that voltage can be applied to buffer within the anolyte buffer tank 742 and the catholyte buffer tank 744. The embodiment of FIG. 7 differs from the embodiment of FIG. 1 primarily in that, rather than having a single porous membrane 160 electrically and/or ionically coupling the center channel to both electrolyte buffer channels 140, the embodiment of FIG. 7 has two porous membranes 762, 764, one electrically and/or ionically coupling the center channel to the buffer tank 742 and another electrically and/or ionically coupling the center channel to the catholyte buffer tank 744. The various components of FIG. 7 can be similar in structure and/or function to those of FIG. 1. Additionally, the overall function of the apparatus of FIG. 7 is similar to that of FIG. 1.

The two porous membranes 762, 764 are positioned to define sides of the center channel. The top and the bottom of the center channel is defined by the top cover 750 and the bottom cover 770, respectively. A spacer 765 defines the height of the center channel. The two porous membranes 762, 764 can each be configured to be wetted on one side by sample flowing through the center channel and wetted on the other side by buffer (e.g., from buffer tanks 742, 744). The porous membranes 760 can be configured such that buffer ions and/or proteins can migrate into/through the membranes while preventing hydrodynamic flow. As discussed in further detail herein, an analyte(s) of interest can be separated from non-target analytes, which can migrate from the center channel into/through the porous membranes 760, the fractionated target analyte(s) can then be collected at the outlet 730.

Figure 2A:
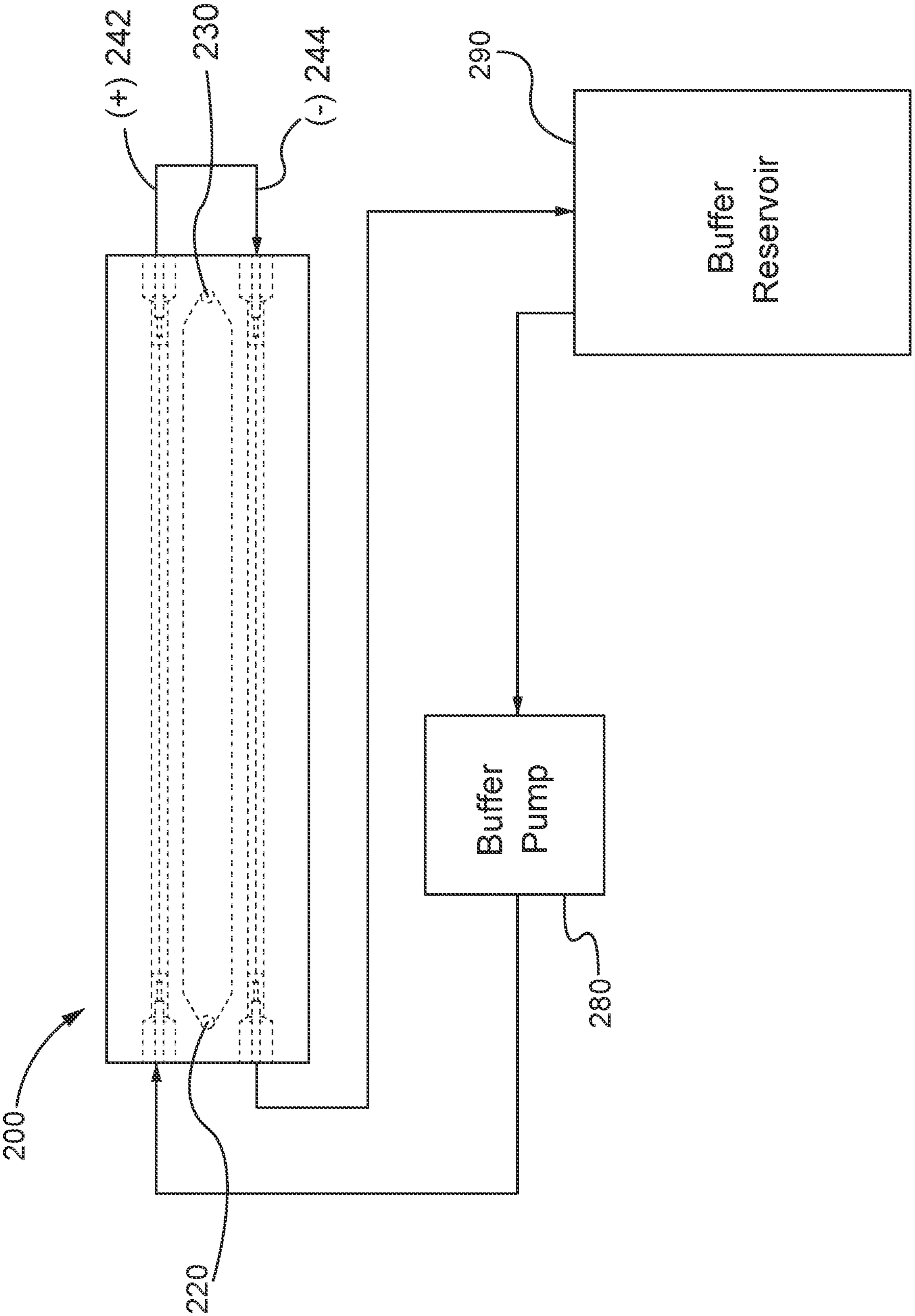
FIGS. 2A and 2B show a re-circulation scheme of electrolyte buffers for a single-channel free-flow electrophoresis device, according to an embodiment.
Figure 2B:
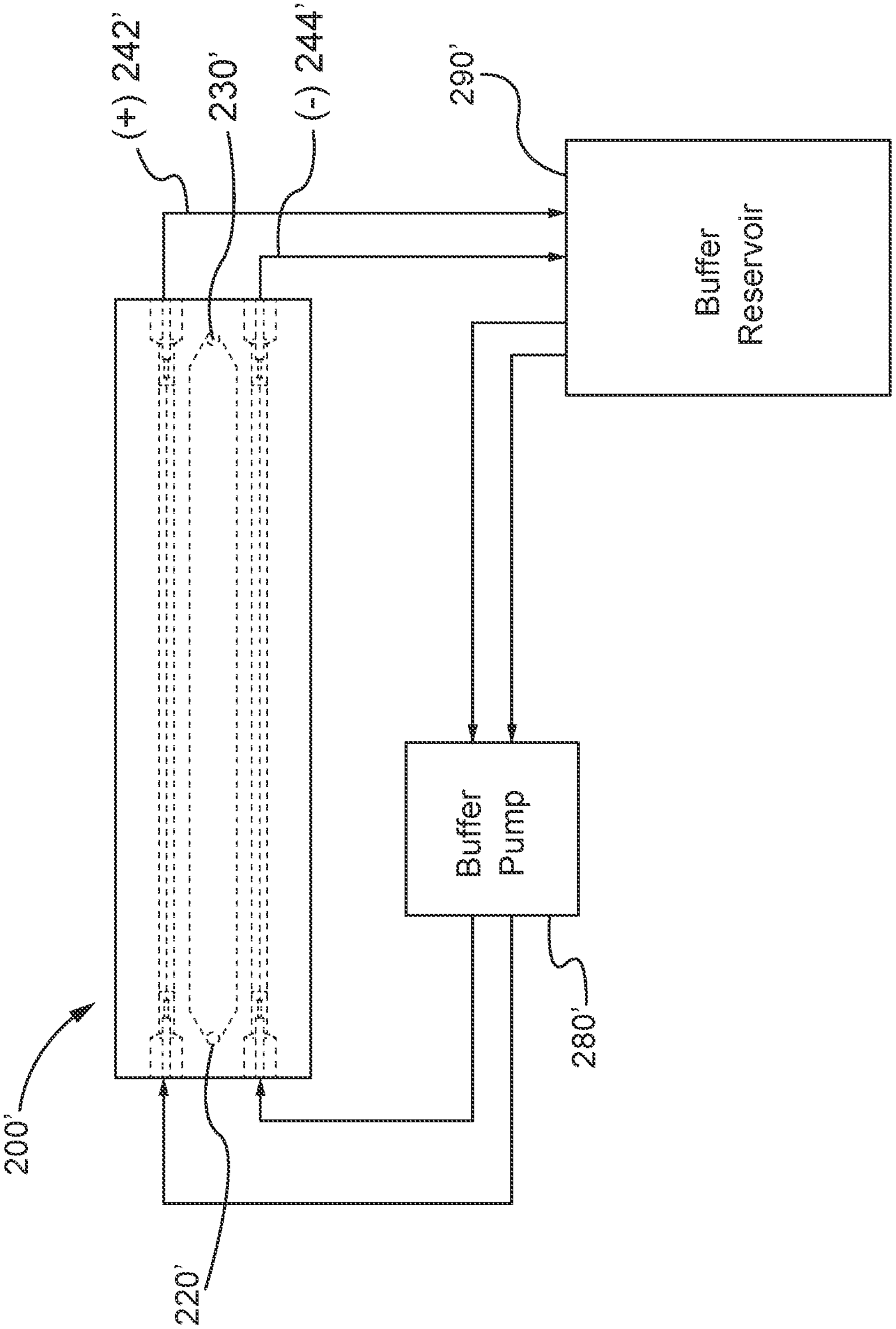

FIG. 2A shows a single-loop electrolyte buffer re-circulation scheme for the single-channel free-flow electrophoresis device, according to an embodiment in which an inlet 220 allows a sample to enter the single center channel, and an outlet 230 allows fractions of a sample to be collected at the opposite side of the device. FIG. 2B shows a dual-loop electrolyte buffer re-circulation scheme for the single-channel free-flow electrophoresis device, according to an embodiment in which an inlet 220' allows a sample to enter the single center channel, and an outlet 230' allows fractions of a sample to be collected at the opposite side of the device 200'. In some embodiments, at least one of the catholyte buffer channel 244 or the anolyte buffer channel 242 is fluidically connected to a reservoir 290 containing an electrolyte buffer. The schematic illustrations shown in FIGS. 2A and 2B can be implemented using any suitable apparatus, such as the apparatus of FIGS. 1 and/or 7.

In some instances, before a sample is introduced into the center channel via the inlet 220, the temperature of a cooler or cold block (e.g., coupled to the bottom plate) can be adjusted down to 5° C. to 15° C., inclusive of all ranges and subranges therebetween. Once temperature stabilizes, the electrolyte buffer, which may be stored in a buffer reservoir with a volume of 100 ml to 500 mL, or other suitable volumes as disclosed herein, can be re-circulated through the buffer channels of the device with a peristatic or another suitable pump 280. The re-circulation of the electrolyte buffer through each of the buffer channels can be accomplished with a single fluidic loop, as shown in FIG. 2A. For example, a pump 280 can transport electrolyte buffer from the buffer reservoir 290 down one buffer channel and back via the other buffer channel.

In other instances, electrolyte buffer can recirculated through the two buffer channels using two fluidic loops, as shown in FIG. 2B. For example, a pump 280' can transport the electrolyte buffer from the buffer reservoir 290' into one end of each of the anolyte buffer channel 242' and the catholyte buffer channel 244' and exiting (e.g., back into the buffer reservoir) by an opposite end of the anolyte buffer channel and catholyte buffer channel.

In yet other instances (not shown in FIG. 2A or 2B), the electrolyte buffer can be circulated through the buffer channels via completely separate loops. For example, a pump can transport an anolyte buffer from a dedicated anolyte buffer reservoir through the anolyte buffer channel and another separate pump can transport catholyte buffer from a catholyte buffer reservoir through the catholyte buffer channel.

Electrolyte buffer (e.g., buffer contained in the buffer reservoir(s)) typically contains electrolytes and polymers. In some embodiments, the electrolyte buffer can be MES buffer. In some embodiments, the electrolyte buffer can be BisTris buffer. In some embodiments, the electrolyte buffer can include any buffers that are suitable for electrophoresis processes, such as Tris/Borate/EDTA, Tris/Acetate/EDTA, etc. In some embodiments, the electrolyte buffer can contain methyl cellulose. In some embodiments, the reservoir can contain an electrolyte buffer having between 0.01% to 1%, 0.05% to 1%, 0.5% to 1%, 0.1% and 0.5%, 0.1% to 0.4%, 0.1% to 0.3%, 0.1% to 0.2%, inclusive of all ranges and subranges therebetween, methyl cellulose.

In some embodiments, the catholytes and the anolytes are re-mixed in the buffer tank or reservoir, thereby maintaining constant pH during use and preserving the capacity of the buffer. The electric resistance of the channel for re-circulation can be at least 50 times, 40 times, 30 times, 20 times, 10 times, inclusive of all ranges and subranges therebetween, higher than the resistance of the device across the center channel and porous membrane(s). This effectively prevents a "short-circuit" through the re-circulation reservoir or through the channel loop as shown in FIG. 2A.

In some embodiments, sample buffers can be used for preparing samples containing the analytes of interest. In some embodiments, the electrolyte buffer is the same as the sample buffer with matching pH, so that the sample can be maintained at a constant pH in the presence of electro-osmotic flow. To slow electro-osmotic flow and allow more effective control of the fractionation process, polymers such as methyl cellulose in a concentration of 0.1%-0.5% may be added into the electrolyte buffer. In some embodiments, the sample may be buffer exchanged into the pre-determined sample buffer and can be further diluted in a pH-controlled buffer in real-time before entering the device.

Figure 6:
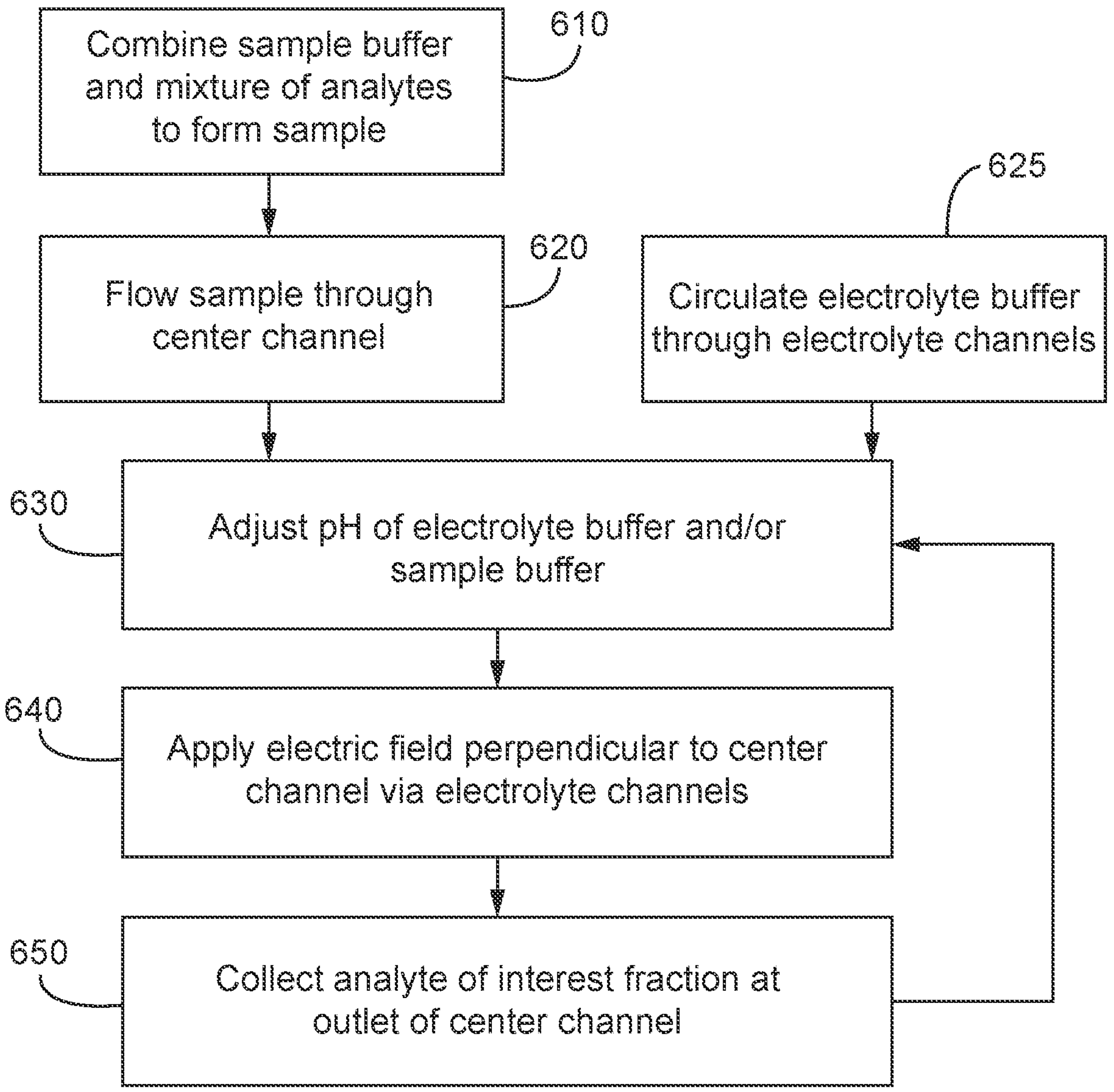
FIG. 6 is a flowchart of a method to sequentially separate protein(s) of interest from a mixture of analytes according to their isoelectric points, according to an embodiment.

The present disclosure provides methods of separating analytes of interest from the sample in accordance with the pI values of the analytes by using the single-channel free-flow electrophoresis. FIG. 6 is a flow chart of a method of separating analytes of interest, according to an embodiment. At 610, a sample buffer can be combined with a mixture of analytes to form a sample. The sample can be introduced into and flowed through a center channel of a single-channel free-flow electrophoresis device via an inlet, at 620. The sample can be pumped through the center channel, such that the sample flows hydrodynamically from the inlet of the center channel to the outlet of the center channel. At 625, a buffer pump can recirculate electrolyte buffer, from a buffer reservoir and through the electrolyte channels, which run parallel to and are disposed on either side of the center channel. Electrodes coupled to the electrolyte channels can be energized such that an electric field is applied perpendicular to the center channel and the flow direction of the sample, at 640. In some embodiments, the anolyte channel, the center channel, and the catholyte channel can be electrically and/or ionically coupled but fluidically isolated via a porous membrane.

By applying an electric field, at 640, perpendicular to the center channel, analytes having pI values other than that of the analyte of interest will migrate away from the direction of the center channel, towards, into, and/or across the porous membrane(s). The flow rate of the sample through the center channel and/or the strength of the electric field can control the purity of the fractionated sample exiting the outlet of the center channel. The analyte of interest can be selectively isolated by, at 630, controlling the pH of the electrolyte buffer and/or the sample buffer such that analytes having pI values that differ from the pH value of the buffer(s) are selectively rejected into/across the porous membrane(s). It should be understood, however, that any electric field that is non-parallel to the center channel will have a vector component perpendicular to the center channel such that analytes having pI values other than that of the analyte of interest will migrate in a direction non-parallel to the direction of hydrodynamic flow and towards, into, and/or across the porous membrane(s).

Multiple analytes of interest and/or multiple purified fractions of the sample can be collected, at 650, by adjusting the pH of the electrolyte buffer and/or the sample buffer at 630. In some instances, the sample can be divided into multiple aliquots, each mixed with a sample buffer having a different pH. After running each aliquot, the pH of the electrolyte buffer can be adjusted to match the pH of the next aliquot. A blank can be run between the aliquots. In other instances, the sample can be run continuously and the sample buffer and/or electrolyte buffer can be adjusted during the run (e.g., with a metered pump or valve) when a sufficient volume of each fraction of the sample is collected.

In some embodiments, the mixture of analytes in the sample as described herein can include peptides having different isoelectric between 1 and 11, 1 and 10, 1 and 9, 1 and 8, 1 and 7, 1 and 6, 1 and 5, 1 and 4, 1 and 3, inclusive of all ranges and subranges therebetween. In some embodiments, the reservoir can contain an electrolyte buffer having a pH value between 0.1 and 14, between 0.5 and 13, between 1 and 14, between 2 and 13, between 3 and 12, between 4 and 11, between 5 and 10, between 6 and 9, between 7 and 8, inclusive of all ranges and subranges therebetween. In some embodiments, the pH value of the electrolyte buffer can be sequentially adjusted by modifying the ratio of MES and BisTris. In some embodiments, the pH value of the electrolyte buffer can be sequentially adjusted by changing the temperature of the electrolyte buffer. Without wishing to be bound by any one theory, the pKa value of the buffers would change in response to the change of temperature and thereby changing the pH values.

By way of example, the pH value of the electrolyte buffer and the sample buffer may be increased from a pH of 3.5 to a pH of 5.5 when a sufficient fraction of the sample (e.g., an analyte of interest) that has a pI value corresponding to pH of 3.5 is collected. In other examples, the pH value of the electrolyte buffer and the sample buffer may be increased from a pH of 6.0 to a pH of 7.5 when a sufficient fraction of the sample (e.g., an analyte of interest) that has a pI value corresponding to pH of 6.0 is collected. In other examples, the pH value of the electrolyte buffer and the sample buffer may be decreased from a pH of 11.0 to a pH of 10.5 when a sufficient fraction of the sample (e.g., an analyte of interest) that has a pI value corresponding to pH of 11.0 is collected. In other aspects of the present disclosure, the pH value of the electrolyte buffer does not need to be modified to collect fractionated analysts of interest from the samples. For example, the collection of fractionated analytes of interest from the samples can be achieved by applying pressure or vacuum to the center channel in a controlled fashion and push unwanted pI fragments (i.e. fragments that do not have the pI values of interests) out of the channel, thereby guiding the target fragments into the collection containers. In yet another example, the collection of fractionated analytes of interest from the samples can be achieved by applying electroosmotic flow through the hydrodynamic impediments to push unwanted pI fragments (i.e. fragments that do not have the pI values of interests) out of the channel, thereby guiding the target fragments into the collection containers.

In some embodiments, fractionated analytes of interest exit the single-channel electrophoresis device via the outlet of the device or apparatus. In some embodiments, the sample can be collected at 650 from the outlet of the device. In some embodiments, the sample can be collected from the outlet of the device continuously. The device or apparatus as described herein can maintain the feature of continuous separation and collection, which allows superior flexibility for the throughput of the fraction of the sample containing the analyte of interest. In some embodiments, the fraction of the sample can be collected from the outlet of the device at the rate between 1 μL per minute and 50 μL per minute, 5 μL per minute and 15 μL per minute, 2 μL per minute and 40 μL per minute, 3 μL per minute and 30 μL per minute, 15 μL per minute and 45 μL per minute, inclusive of all ranges and subranges therebetween.

Although not shown in FIG. 6, in some embodiments, a blank sample can be run before introducing the sample and collecting a subsequent sample (e.g., an analyte of interest) corresponding to proteins with a pI equal to the newly adjusted pH. This process may be repeated for any number of pH values to ensure the accuracy of the collections. The buffer pH adjustment at 630 can be done automatically with a metered pump or a metered valve.

Although not shown in FIG. 6, in some embodiments, before the start of the electrophoresis, the device can be first pre-wet by flowing 25% ethanol solution into the center channel. In some embodiments, the device is pre-wet by flowing ethanol solution with any suitable concentrations into the center channel. In some embodiments, the device is pre-wet by flowing 0.1% Tween 20 solution into the center channel. In some embodiments, the device is pre-wet by flowing Tween 20 solution with any suitable concentrations into the center channel. Flowing ethanol solution or Tween 20 solution into the center channel or membrane can minimize the bubble formation in the channel. In some embodiments, incubation in ethanol solution or Tween 20 solution for 5 minutes to 10 minutes can ensure the membrane(s) is fully wet.

In some embodiments, the fraction of the sample can contain the analyte of interest collected at a rate between 1 μL per minute and 50 μL per minute, 5 μL per minute and 15 μL per minute, 2 μL per minute and 40 μL per minute, 3 μL per minute and 30 μL per minute, 15 μL per minute and 45 μL per minute, inclusive of all ranges and subranges therebetween.

Figure 3A:
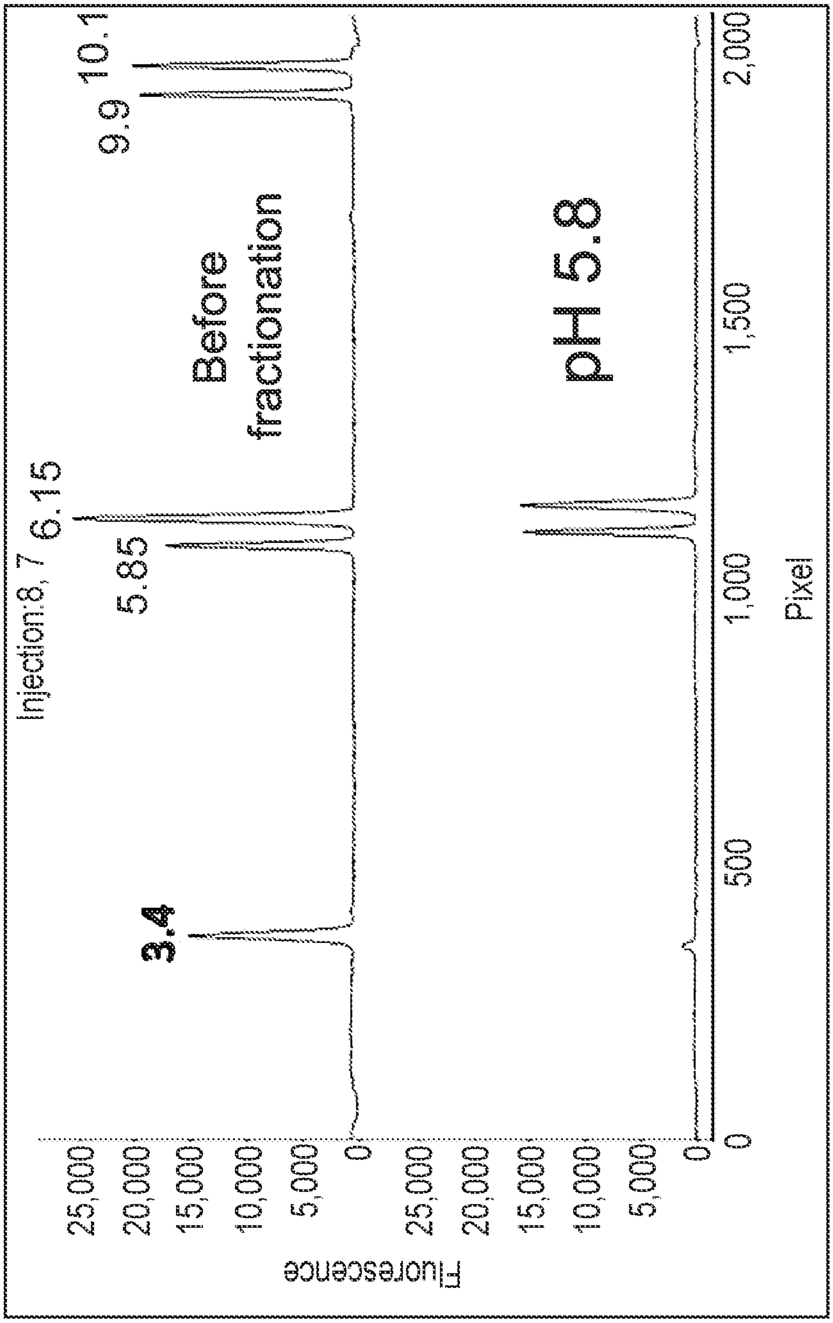
FIGS. 3A-3C show examples of the fractionation of a mixture of peptides with pI ranging from 3.4 to 10.1. In this example, the buffer system is based on MES-BisTris. The buffer pH was adjusted by changing the ratio of MES and BisTris.
Figure 3B:
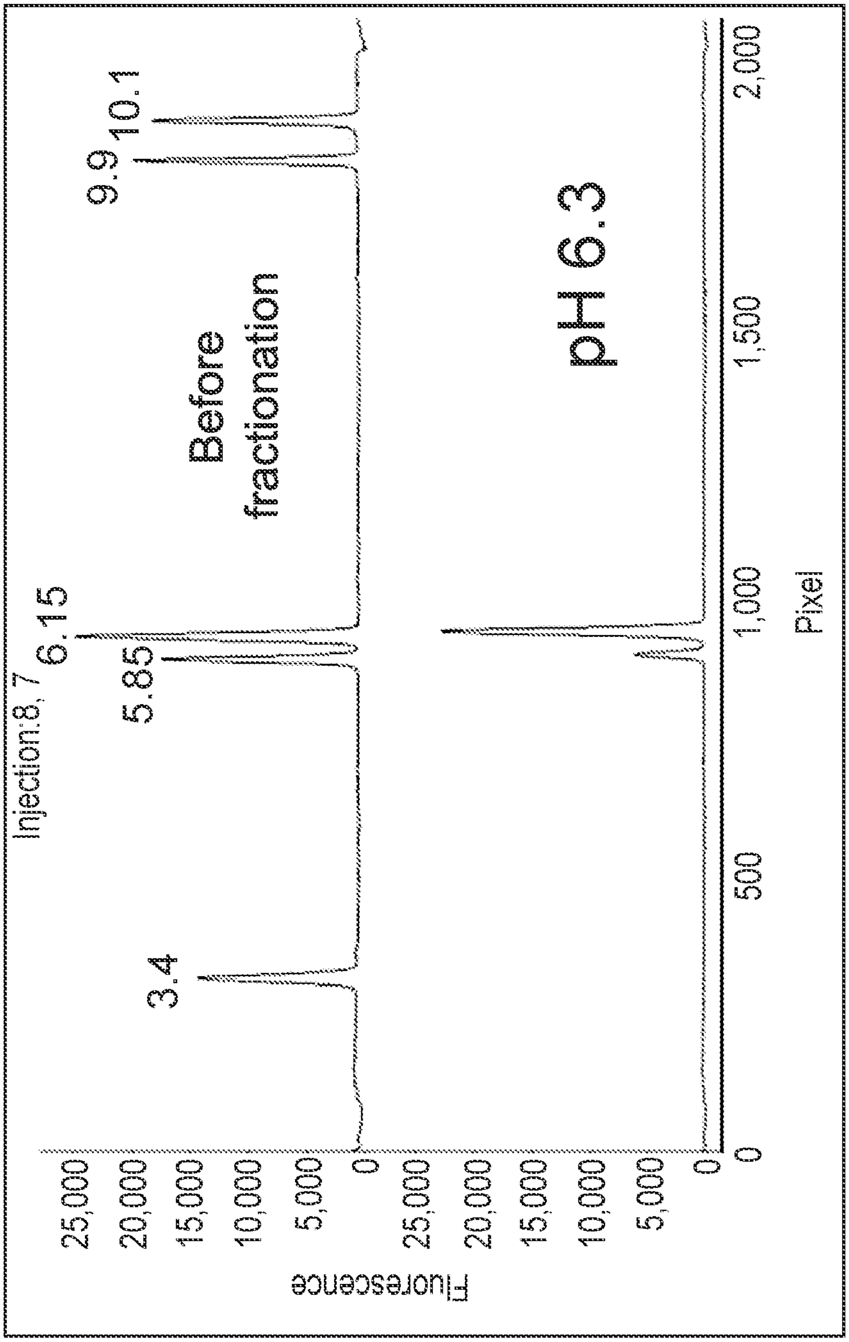
Figure 3C:
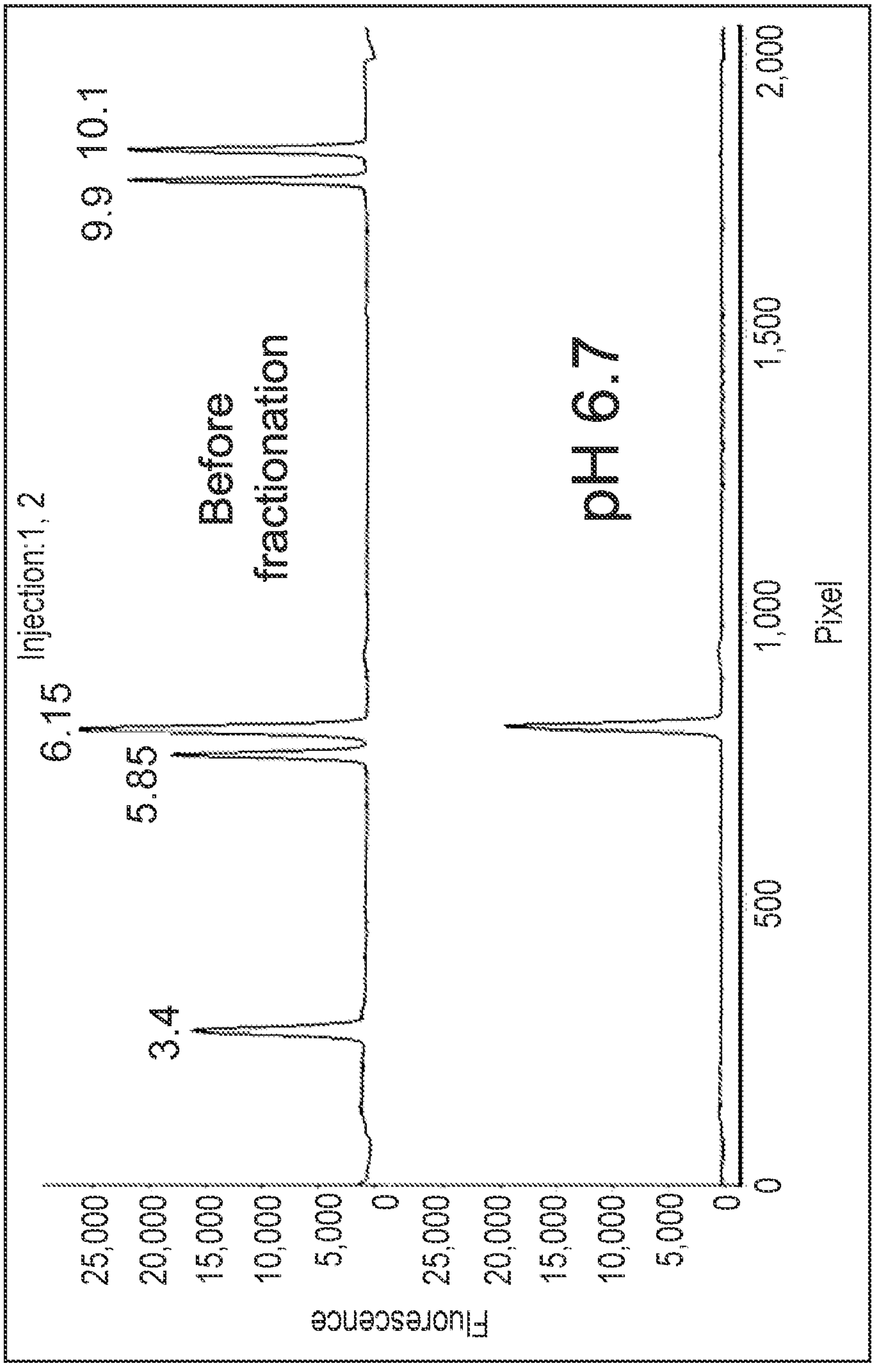

By way of examples, FIG. 3A-FIG. 3C show the fractionation of the mixture of peptides with pI values in the range of 3.4 to 10.1 by using MES-BisTris buffers, as measured by Maurice® IEF (e.g. isoelectric focusing system or technology) commercially available from ProteinSimple®. In some embodiments, the pH value can be changed by adjusting the ratio of MES to BisTris. The sample is a mixture of five peptides with pI values at 3.4, 5.85, 6.15, 9.9, and 10.1. By sequentially changing the buffer pH from 5.8 to 6.7, peptides with pI values that are not within this range of the pI values (e.g., pI values of 3.4, 9.9, and 10.1) were nearly undetectable after fractionation. The relative amount of peptides at pI values of 5.85 and 6.15 change when buffer pH increases from 5.8 to 6.7. FIG. 3C shows that at pH 6.7, the peptide having a pI value of 5.85 becomes undetectable and only a single peptide having a pI value of 6.15 can be collected.

Figure 4A:
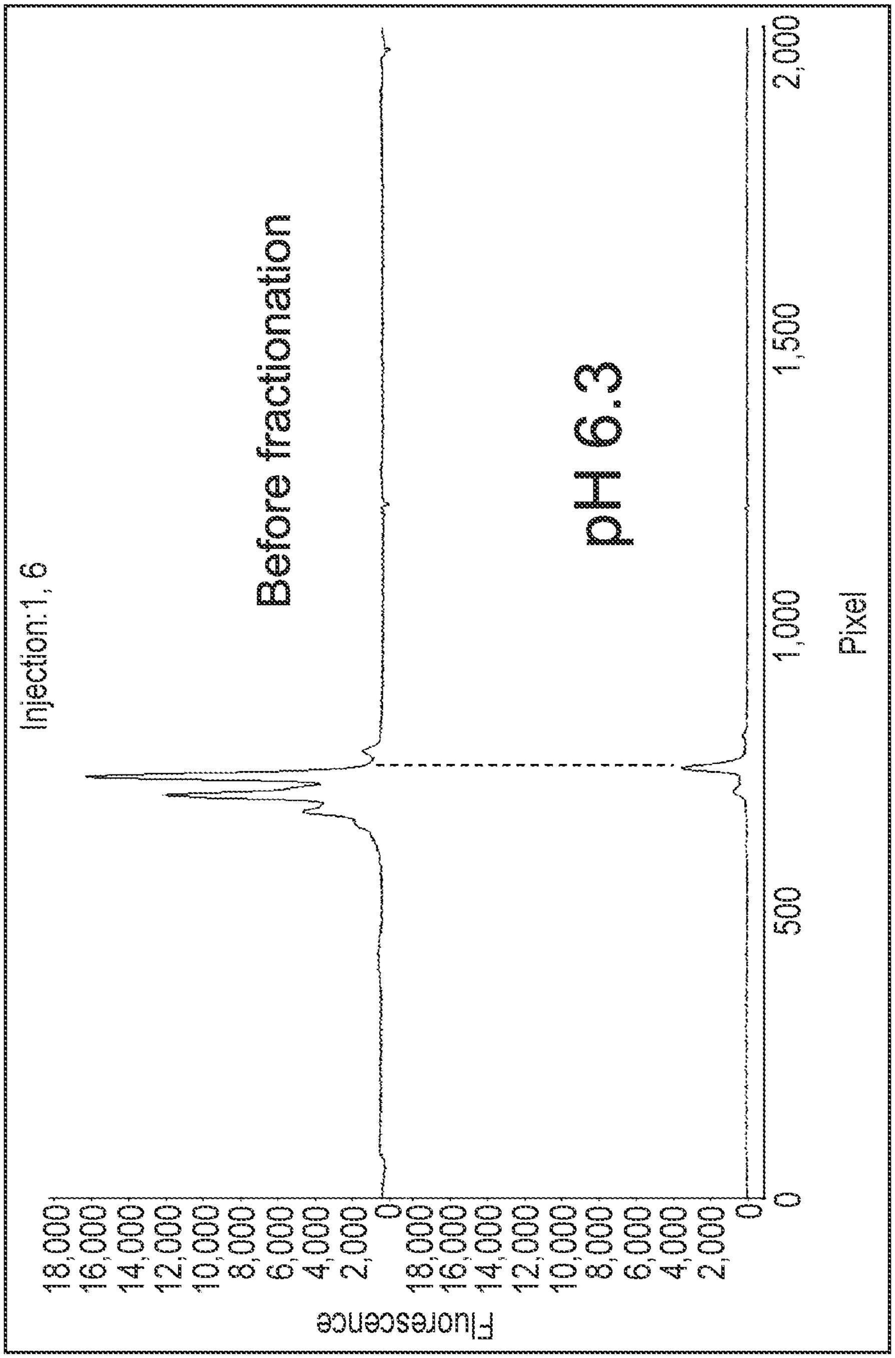
FIGS. 4A and 4B show examples of the fractionation of a mixture of peptides comprising acidic IgG molecules. In this example, the buffer system is based on MES-BisTris.
Figure 4B:
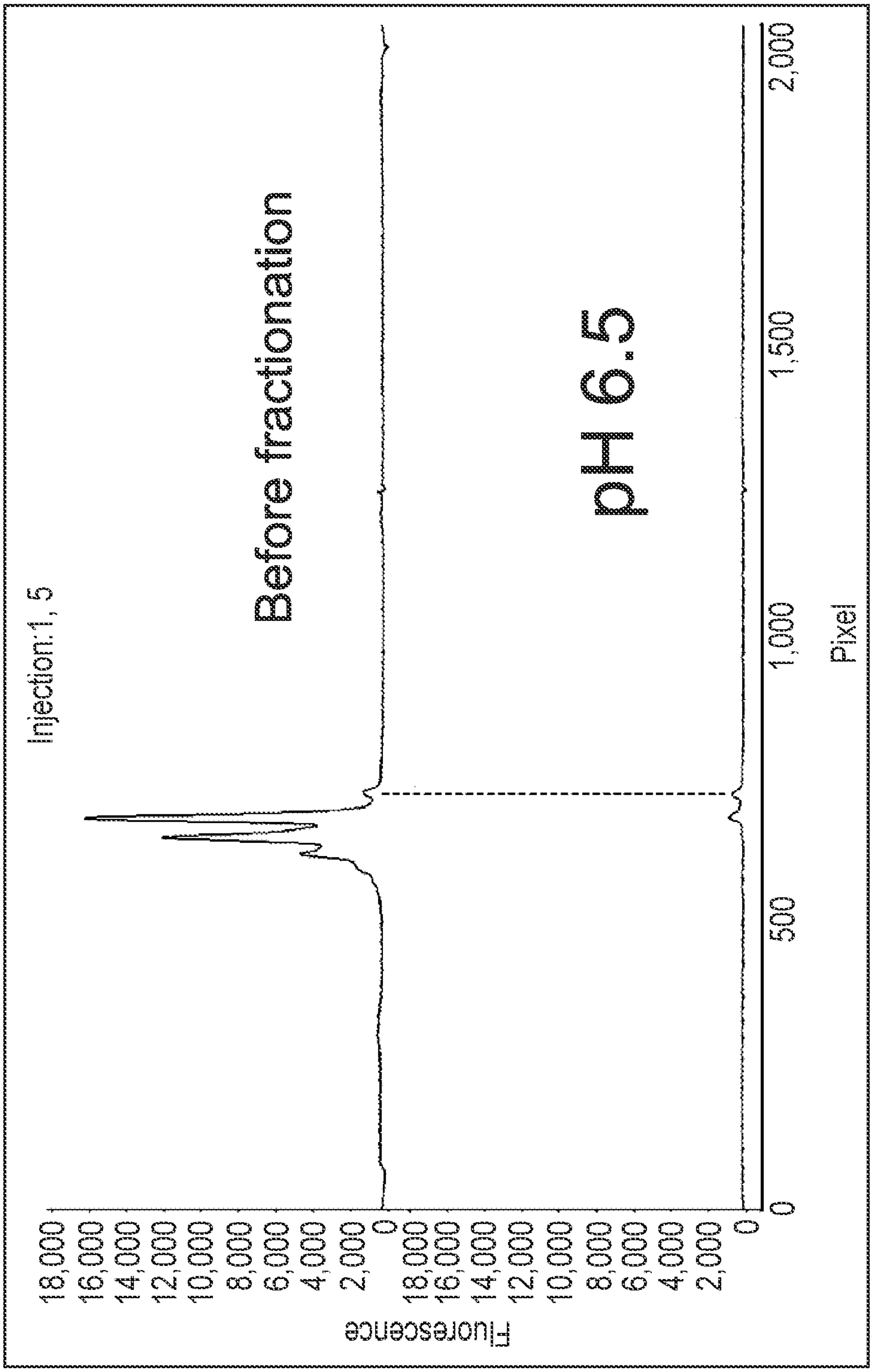

As another example, FIG. 4B shows the fractionation of IgG with pI values in the range of 5.6-5.9 by using the device or apparatus as described herein by using the MES-BisTris buffer. In some embodiments, the pH value can be changed by adjusting the ratio of MES to BisTris. The sample is a mixture of four fragments of this IgG with pI values at 5.65, 5.72, 5.8, and 5.9. As shown in FIG. 4A, with buffer pH at 6.3, the fragment at a pI value of 5.65 is undetectable after fractionation, while the fragments with higher pI values increase their relative abundance. FIG. 4B shows that as buffer pH increases to 6.5, both fragments at pI 5.65 and 5.72 are undetectable after the fractionation processes, while the relative amount of the fragment at a pI value of 5.9 increases from 3.5% to about 50%.

Figure 5:
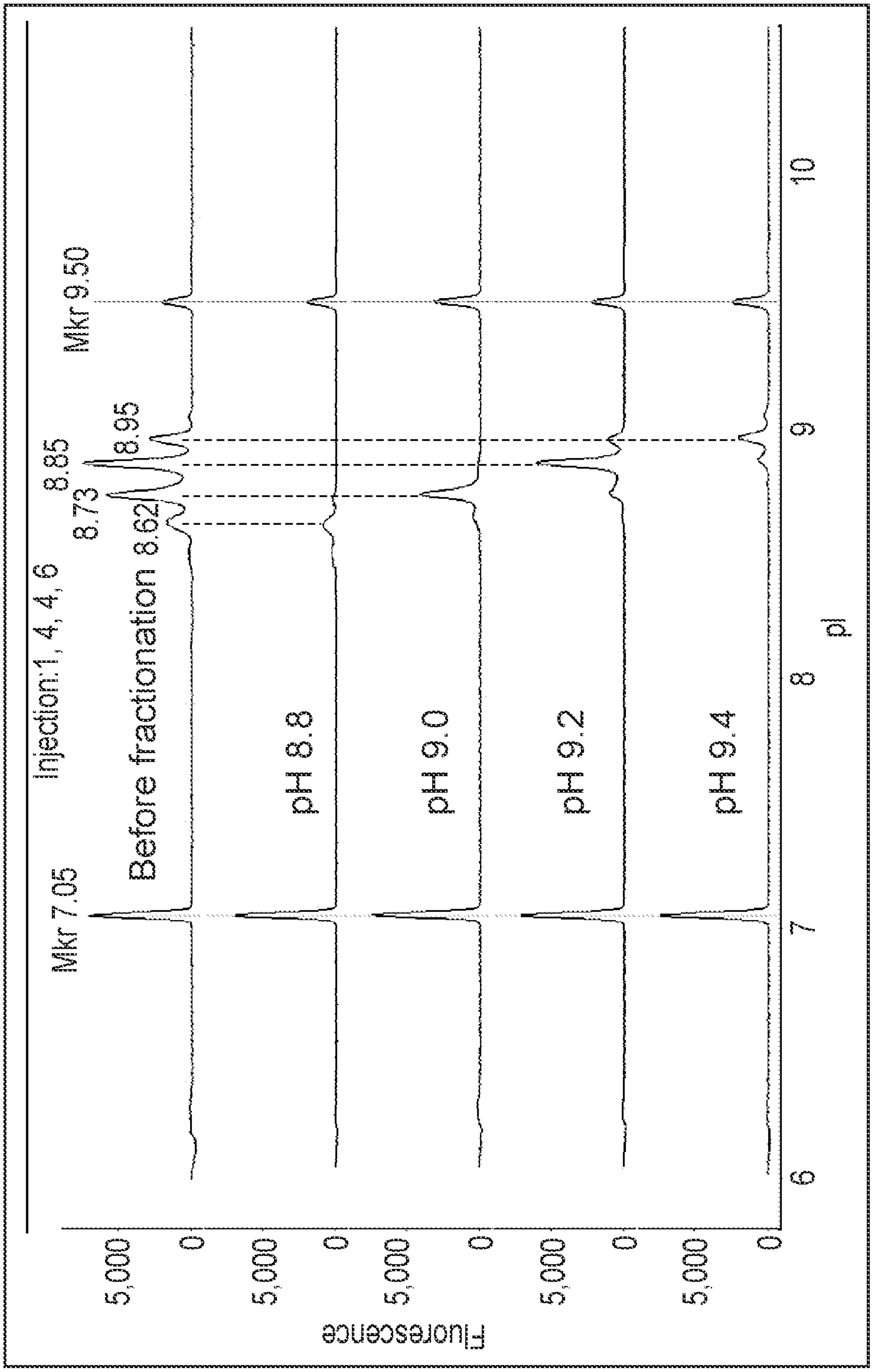
FIG. 5 shows an example of the fractionation of the basic proteins Herceptin. 2-Amino-2-methyl-1,3-propanediol (AMPD) was used as the buffer and the pH was varied from 8.8 to 9.4.

FIG. 5 shows an example of the fractionation of basic proteins by using the device or apparatus as described herein. By way of examples, herceptin monoclonal antibody with four main fragments with pI values at 8.62, 8.73, 8.85, and 8.95 can be fractionated by using 2-Amino-2-methyl-1,3-propanediol (AMPD) as the buffer. In some embodiments, the fractionation of herceptin monoclonal antibody can be processed by using any other suitable buffers. Without wishing to be bound by any one theory, AMPD has an effective pH range of 7.8 to 9.7. At a buffer pH of 8.8, the relatively minor peak at pI 8.63 can become the most abundant peak, which represents the increase of the percent of the total peak area for this peak from about 13.4% to about 83.5%.

FIG. 5 also shows that when the buffer pH is increased to 9.0, the second peak at the pI value of 8.73 can be enriched from 34.9% to 83.7%, while the abundance of other peaks can be significantly reduced. At pH 9.2, the third peak, which is the main peak before fractionation, can be enriched from 36.1% to 68.3%, while the first peak at a pI value of 8.63 can no longer be detected. At pH 9.4, the pI fragment of 8.95 is at 70.2%, compared to 14.7% prior to the fractionation processes. At pH 9.4, the fragments having pI values of 8.63 and 8.73 are undetected. A slight mismatch of the pI value of the collected fragments and the pH of the buffer was observed, which may be due to the presence of EOF because EOF may skew the collection of the fractionated analyte of interest. Another plausible explanation is measurement error due to the pH buffer.

Where apparatus and/or methods described above indicate certain events and/or procedures occurring in a certain order, the ordering of certain events and/or procedures may be modified. Additionally, certain events and/or procedures may be performed concurrently in a parallel process when possible, as well as performed sequentially as described above.

The invention claimed is:

1. An apparatus, comprising:

a body defining:

an inlet configured to receive a sample containing a plurality of analytes in a sample buffer;

a single outlet positioned linearly downstream from the inlet; the single outlet configured to expel a fractionated portion of the sample;

a catholyte channel containing a first electrolyte buffer and configured to be coupled to a cathode;

an anolyte channel containing a second electrolyte buffer and configured to be coupled to an anode; wherein the first electrolyte buffer and the second electrolyte buffer are a common electrolyte buffer;

a cover;

a hydrodynamic impediment;

a center channel at least partially formed by the hydrodynamic impediment, the body, and the cover; wherein the center channel extends between the inlet and the single outlet, wherein the center channel is parallel to the catholyte channel and the anolyte channel;

a reservoir containing the common electrolyte buffer, the reservoir fluidically coupled to the anolyte channel and the catholyte channel; and a pump configured to recirculate the common electrolyte buffer from the reservoir and through the anolyte channel and the catholyte channel;

wherein the hydrodynamic impediment allows at least some of the plurality of analytes to migrate into the hydrodynamic impediment towards one of the catholyte channel or the anolyte channel;

wherein the fractionated portion of the sample expelled through the single outlet has an isoelectric point matching a pH of the sample buffer.

2. The apparatus of claim 1, wherein the hydrodynamic impediment includes a hollow space formed in the center of the hydrodynamic impediment; and wherein the center channel is at least partially formed by the hollow space.

3. The apparatus of claim 1, wherein the hydrodynamic impediment is a first hydrodynamic impediment in direct fluid contact with the center channel and the first electrolyte buffer, and wherein the apparatus further comprises:

a second hydrodynamic impediment in direct fluid contact with the center channel and the second electrolyte buffer.

4. The apparatus of claim 1, wherein the reservoir has a volume between 100 mL and 500 mL.

5. The apparatus of claim 1, wherein the pump recirculates the common electrolyte buffer from the reservoir and through the anolyte channel and the catholyte channel in a single loop.

6. The apparatus of claim 1, wherein the pump recirculates the common electrolyte buffer from the reservoir through the anolyte channel and the catholyte channel, separately, in two loops.

7. The apparatus of claim 1, further comprising:

the anode; and the cathode.

8. The apparatus of claim 1, a wherein the reservoir contains MES-BisTris.

9. The apparatus of claim 1, wherein the reservoir contains the common electrolyte buffer and polymers.

10. The apparatus of claim 1, wherein the reservoir contains the common electrolyte buffer and methyl cellulose.

11. The apparatus of claim 1, wherein the reservoir contains the common electrolyte buffer having between 0.1% and 0.5% methyl cellulose.

12. The apparatus of claim 1, wherein the anolyte channel and the catholyte channel are collectively configured to apply an electric field across and perpendicular to the center channel.

13. The apparatus of claim 1, wherein the plurality of analytes includes peptides having different isoelectric points between 1 and 11.

14. The apparatus of claim 1, wherein the common electrolyte buffer has a pH value between 0.1 and 14.

15. The apparatus of claim 1, wherein the hydrodynamic impediment is constructed of at least one of cellulose, polyvinylidene fluoride, polyvinylidene difluoride, or polytetrafluoroethylene.

16. The apparatus of claim 1, wherein pores of the hydrodynamic impediment have a median characteristic length between 25 nm and 800 nm.

17. The apparatus of claim 1, wherein the hydrodynamic impediment has a width between 100 μm and 200 μm.

18. The apparatus of claim 1, wherein the center channel has a width between 1 mm and 10 mm and a length between 10 cm and 20 cm.

19. The apparatus of claim 1, wherein the hydrodynamic impediment fluidically isolates but electrically couples the center channel to at least one of the anolyte channel or the catholyte channel.

20. The apparatus of claim 1, wherein the hydrodynamic impediment is a porous membrane.

21. The apparatus of claim 1, wherein the hydrodynamic impediment is a gel material.

22. The apparatus of claim 1, wherein the hydrodynamic impediment is a network of microchannels or a network of nanochannels.

23. The apparatus of claim 1, wherein the hydrodynamic impediment is in direct fluid contact with at least one of the first electrolyte buffer or the second electrolyte buffer.

24. The apparatus of claim 1, wherein the hydrodynamic impediment is positioned between the cover and the body.

25. The apparatus of claim 1, wherein the at least some of the plurality of analytes migrating through the hydrodynamic impediment has an isoelectric point different than the pH of the sample buffer.

26. The apparatus of claim 1, wherein the body is plastic.

27. The apparatus of claim 1, wherein the cover is non-porous.

* * * * *